(12) United States Patent
Cox et al.

(10) Patent No.: US 9,032,101 B1
(45) Date of Patent: May 12, 2015

(54) CHIPSET SUPPORT FOR BINDING AND MIGRATING HARDWARE DEVICES AMONG HETEROGENEOUS PROCESSING UNITS

(75) Inventors: Michael Brian Cox, Menlo Park, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1464 days.

(21) Appl. No.: 12/332,009

(22) Filed: Dec. 10, 2008

(51) Int. Cl.
 G06F 3/00 (2006.01)
 G06F 12/10 (2006.01)
 G06F 12/02 (2006.01)

(52) U.S. Cl.
 CPC ........ *G06F 12/1081* (2013.01); *G06F 12/0292* (2013.01)

(58) Field of Classification Search
 None
 See application file for complete search history.

(56) References Cited

U.S. PATENT DOCUMENTS

| | | | |
|---|---|---|---|
| 5,682,512 A * | 10/1997 | Tetrick | 711/202 |
| 5,893,144 A | 4/1999 | Wood et al. | |
| 6,275,907 B1 | 8/2001 | Baumgartner et al. | |
| 6,418,514 B1 | 7/2002 | Arimilli et al. | |
| 6,438,660 B1 * | 8/2002 | Reams | 711/143 |
| 6,754,739 B1 | 6/2004 | Kessler et al. | |
| 7,596,654 B1 | 9/2009 | Wong | |
| 2003/0009640 A1 | 1/2003 | Arimilli et al. | |
| 2004/0019731 A1 | 1/2004 | Brown | |
| 2005/0060439 A1 | 3/2005 | Duncan et al. | |
| 2005/0120173 A1 * | 6/2005 | Minowa | 711/114 |
| 2008/0162873 A1 | 7/2008 | Zimmer et al. | |
| 2009/0182979 A1 | 7/2009 | Farrell et al. | |
| 2009/0198792 A1 | 8/2009 | Wittenschlaeger | |

FOREIGN PATENT DOCUMENTS

| | | |
|---|---|---|
| JP | 06-187286 | 7/1994 |
| JP | 09-128346 | 5/1997 |
| KR | 1020070052272 | 5/2007 |

OTHER PUBLICATIONS

JP Office Action, Application No. 2009-280697 dated Aug. 3, 2011.
Office Action, U.S. Appl. No. 12/332,016, dated Mar. 16, 2011.
KIPO Office Action, KR Appl. No. 10-2009-122330, mailed Mar. 15, 2011. (See summary from p. 1-3 of enclosure from Kim & Chang).

* cited by examiner

*Primary Examiner* — Henry Tsai
*Assistant Examiner* — Aurangzeb Hassan
(74) *Attorney, Agent, or Firm* — Artegis Law Group, LLP

(57) ABSTRACT

A method for providing access to hardware devices by a processor without causing conflicts with other processors included in a computer system. The method includes receiving a first address map from a first processor and a second address map from a second processor, where each address map includes memory-mapped input/output (I/O) apertures for a set of hardware devices that the processor is configured to access. The method further includes generating a global address map by combining the first address map and the second address map, receiving a first access request from the first processor and routing the first access request to a hardware device based on an address mapping included in the global address map. Advantageously, heterogeneous processors included in multi-processor system can access any hardware device included in the computer system, without modifying the processors, one or more operating systems executed by each processor, or the hardware devices.

20 Claims, 9 Drawing Sheets

CHIPSET SUPPORT FOR BINDING AND MIGRATING HARDWARE DEVICES AMONG HETEROGENEOUS PROCESSING UNITS

BACKGROUND OF THE INVENTION

1. Field of the Invention

The present invention relates generally to the field of computer architecture, and, more specifically, to chipset support for binding and migrating hardware devices among heterogeneous processing units.

2. Description of the Related Art

As is well-known, a central processing unit (CPU) executing an operating system (OS) can access a system memory and/or one or more hardware devices when performing input/output (I/O) operations. The I/O operations may be routed to and from the CPU through one or more bridges, including a memory bridge (e.g., "Northbridge" chip) and/or an I/O bridge (e.g., "Southbridge" chip). The one or more hardware devices may include memory modules, computer monitors, hard disk drives, and CD-ROM drives, Universal Serial Bus (USB) controllers, PCI Express (PCIe) controllers, among others. The hardware devices may be integrated hardware devices or peripheral hardware devices.

One problem with conventional computer architectures is they are designed with the underlying assumption that there is only a single CPU included in the computer system. Accordingly, when implementing a multi-processor system using conventional architecture schemes, conflicts may be created when one CPU attempts to access a hardware device, since each CPU believes that the CPU has full and exclusive access to all of the hardware devices.

Another problem with conventional architectures is that chipsets, hardware device controllers, and the underlying hardware devices, are typically not designed for use in a multi-processor computer system. Again, conflicts and/or system crashes may occur when two processors attempt to access, simultaneously or not simultaneously, the same hardware device.

Some prior art computer architectures attempt to overcome these drawbacks by allowing two CPUs to coexist in the computer system. However, in these prior art computer architectures, each CPU must be aware of any other CPUs in the computer system and must be specially configured to operate in the multi-processor system. Additionally, in many prior art multi-CPU systems, the multiple processors are homogeneous, meaning that they are substantially the same and/or from the same vendor.

Accordingly, there remains a need in the art for an improved technique for allowing multiple heterogeneous processing units to access a plurality of hardware devices in the same system.

SUMMARY OF THE INVENTION

Embodiments of the invention provide a system and method for providing access to hardware devices included in a computer system by a processor without causing conflicts with other processors included in the computer system. The method includes receiving a first address map from a first processor that includes memory-mapped input/output (I/O) apertures for a first set of hardware devices that the first processor is configured to access, and receiving a second address map from a second processor that includes memory-mapped I/O apertures for a second set of the hardware devices that the second processor is configured to access. The method further includes generating a global address map by combining the first address map and the second address map, receiving a first access request from the first processor, and routing the first access request to a hardware device associated with the first access request based on an address mapping included in the global address map.

Other embodiments of the invention include a computer-readable medium storing instructions that, when executed by a processor, configure a computer system to implement one or more variations of the above method, as well as a device controller configured to implement one or more variations of the above method.

One advantage of the disclosed method is that heterogeneous processors included in multi-processor system can access any integrated hardware device included within the chipset or any peripheral hardware device attached on an external bus (e.g., PCI, PCIe, etc), without modifying the processors, the operating systems, or the hardware devices.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1A:
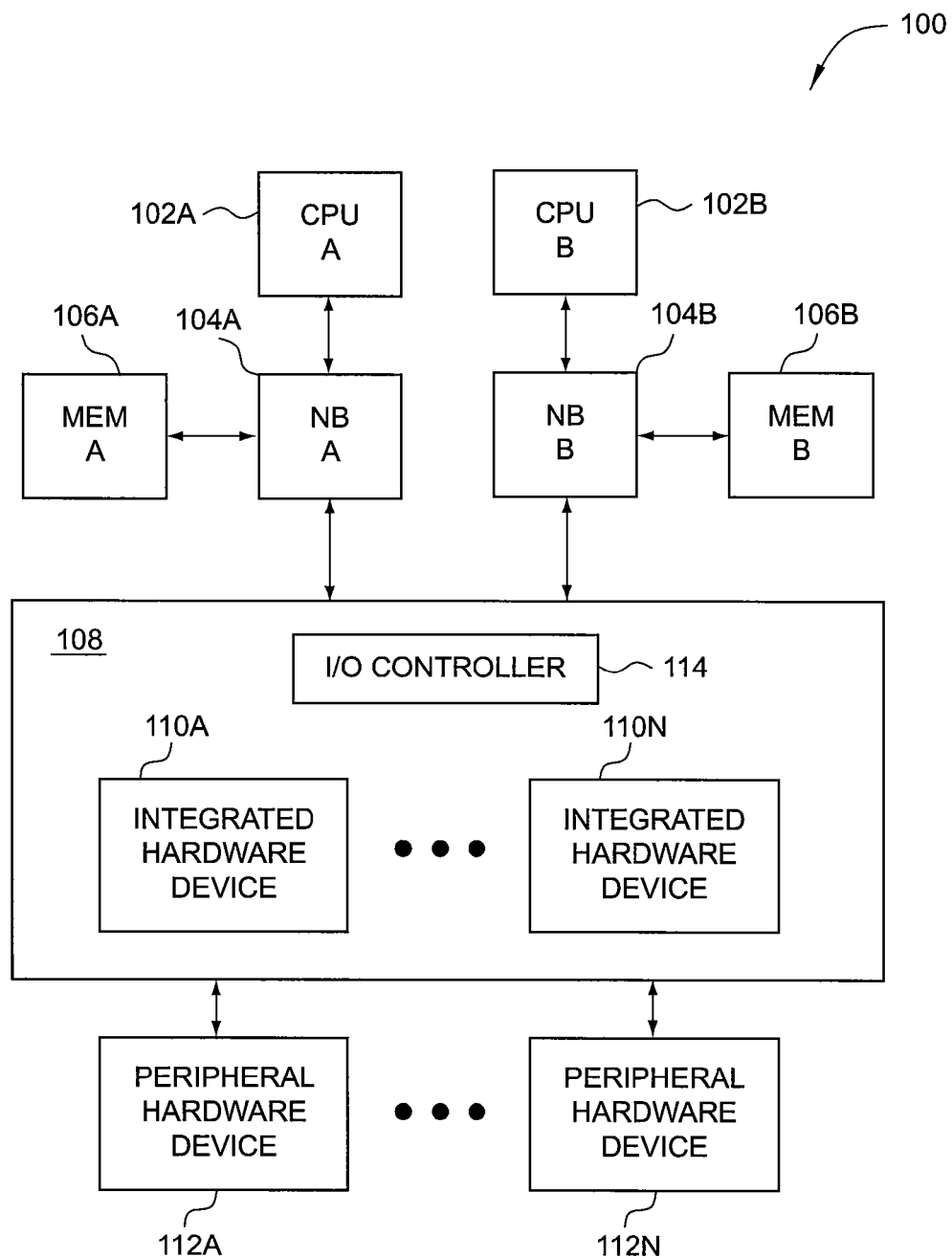
FIGS. 1A-1D are conceptual diagrams of computer systems configured to bind and migrate hardware devices among heterogeneous processing units, according to various embodiment of the invention.

FIG. 1A is a conceptual diagram of a computer system 100 configured to bind and migrate hardware devices among heterogeneous processing units, according to one embodiment of the invention. As shown, the computer system 100 includes processor 102A, processor 102B, memory bridge 104A, memory bridge 104B, memory 106A, memory 106B, and input/output (I/O) management module 108. The I/O management module 108 is coupled to peripheral hardware devices 112A-412N and includes an I/O controller 114 and integrated hardware devices 120A-420N.

The processor 102A, the processor 102B, the peripheral hardware devices 112A-412N, and the integrated hardware devices 110A-410N may be associated with one or more drivers stored in memory 106A and/or memory 106B. The drivers are software programs that, when executed by either the processor 102A and/or the processor 102B translate program instructions into different types of machine code. For example, the processor 102A could execute the driver associated with the processor 102A to translate program instructions into machine code native to the processor 102A.

Processor 102A and processor 102B may each be a central processing unit (CPU) configured execute software programs to implement the various functions of the computer system 100. These software programs include one or more operating systems executing each of the processors 102A, 102B. The operating systems provide a user with different computing environments that may be used to execute applications associated with each computing environment. For example, a first operating system executed by processor 102A could be a Windows® operating system, which may provide the user with access to programs such as Microsoft® Office, while a second operating system executed by processor 102B could be a UNIX-based operating system that functions as a file transfer protocol (FTP) server.

The processor 102A is coupled to the memory bridge 104A and the processor 102B is coupled to the memory bridge 104B. In one embodiment, the memory bridges 104A, 104B each comprise a Northbridge chip. The memory bridge 104A is coupled to the memory 106A and the memory bridge 104B is coupled to the memory 106B. The processor 102A may read data from and write data to the memory 106A through the memory bridge 104A, and the processor 102B may read data from and write data to the memory 106B through the memory bridge 104B. This data may include software programs as well as other types of data.

Each memory bridge 104A, 104B is coupled to the I/O management module 108. The I/O management module 108 allows the peripheral hardware devices 112A-412N and the integrated hardware devices 110A-410N to be accessible to the processors 102A, 102B and to the software programs executed by these processing units. In one embodiment, the I/O management module 108, also referred to herein as the "chipset" 108, comprises a Southbridge chip. The peripheral hardware devices 112A-412N may be coupled to the I/O management module 108 using a connector such as, for example, a universal serial bus (USB) connector or a firewire connector. The peripheral devices 112A-412N may include a keyboard, a mouse, a printer, a scanner, a disk drive, a flash drive, a tape drive, a microphone, a speaker, a computer monitor, a digital video camera, or another computer system, among others.

The integrated hardware devices 110A-410N are located on the same chip that stores the I/O management module 108 and provides various system functions to the computer system 100. The integrated hardware devices 110A-410N include a real-time clock, an advanced power management (APM) module, a peripheral component interface (PCI) bus, a PCI Express (PCIe) bus, a direct memory access (DMA) controller, an interrupt controller, a baseboard management controller, a peripheral advanced technology attachment (PATA) controller, a serial advanced technology attachment (SATA) controller, or a nonvolatile basic input/output system (BIOS) memory, among others.

The peripheral hardware devices 112A-412N and the integrated hardware devices 110A-410N, referred to collectively herein as "hardware devices," are accessible to the processors 102A, 102B via the memory bridges 104A, 104B, respectively, and the I/O management module 108.

The I/O controller 114 is a functional unit configured to arbitrate and route access requests between the processors 102A, 102B and the hardware devices. The I/O controller 114 may be implemented as hardware, as software, or as a combination of hardware and software. For example, the I/O controller 114 can be implemented as firmware included in the I/O management module 108 executed by a general purpose processor.

The I/O controller 114 is configured to intercept access requests transmitted by the processors 102A, 102B (also referred to herein as "downstream transactions") and functions to avoid conflicts between the multiple processors 102A, 102B that access the hardware devices and routes the access requests to the appropriate hardware device. The I/O controller 114 also intercepts return transactions and interrupts transmitted by the hardware devices (also referred to herein as "upstream transactions") and routes these transactions to the corresponding processor.

Embodiments of the invention provide chipset support for allowing each processor 102A, 102B in the computer system 100 to use and access any hardware device included in the computer system 100, without processor or operating system modification. Embodiments of the invention specifically provide support for routing transactions between each processor 102A, 102B and hardware devices, for routing transactions between the hardware devices and memories 106A, 106B, for binding the hardware devices to each processor 102A, 102B, for migrating devices between the processors 102A, 102B, and for routing peer-to-peer transactions between hardware devices. Additionally, embodiments of the invention do not rely on modification to any particular hardware device controller. Instead, the embodiments of the invention rely on modifications within the chipset 108.

The computer system 100 illustrated in FIG. 1A includes two processors 102A, 102B and two memory bridges 104A, 104B. However, embodiments of the invention equally apply to a system architecture having any number of processors and memory bridges. Additionally, each processor 102A, 102B may be, but is not required to be, heterogeneous, which includes processors from different vendors, with potentially different instruction sets, running potentially different operating systems, and with any number of other differences.

Furthermore, additional embodiments of computer system 110 include components such as a network adapter, system disk, add-in cards, display device, parallel processing subsystem that includes a parallel processing unit (PPU), such as a graphics processing unit (GPU), among others, none of which are shown in FIG. 1A to avoid obscuring embodiments of the invention.

Persons skilled in the art will understand that the architecture described in FIG. 1A in no way limits the scope of the present invention and that the techniques taught herein may be implemented on any properly configured processing unit(s), including, without limitation, one or more CPUs, one or more multi-core CPUs, one or more PPUs, one or more programmable and/or not programmable GPUs, one or more special purpose processing units, or the like, without departing the scope of the present invention.

Figure 1B:
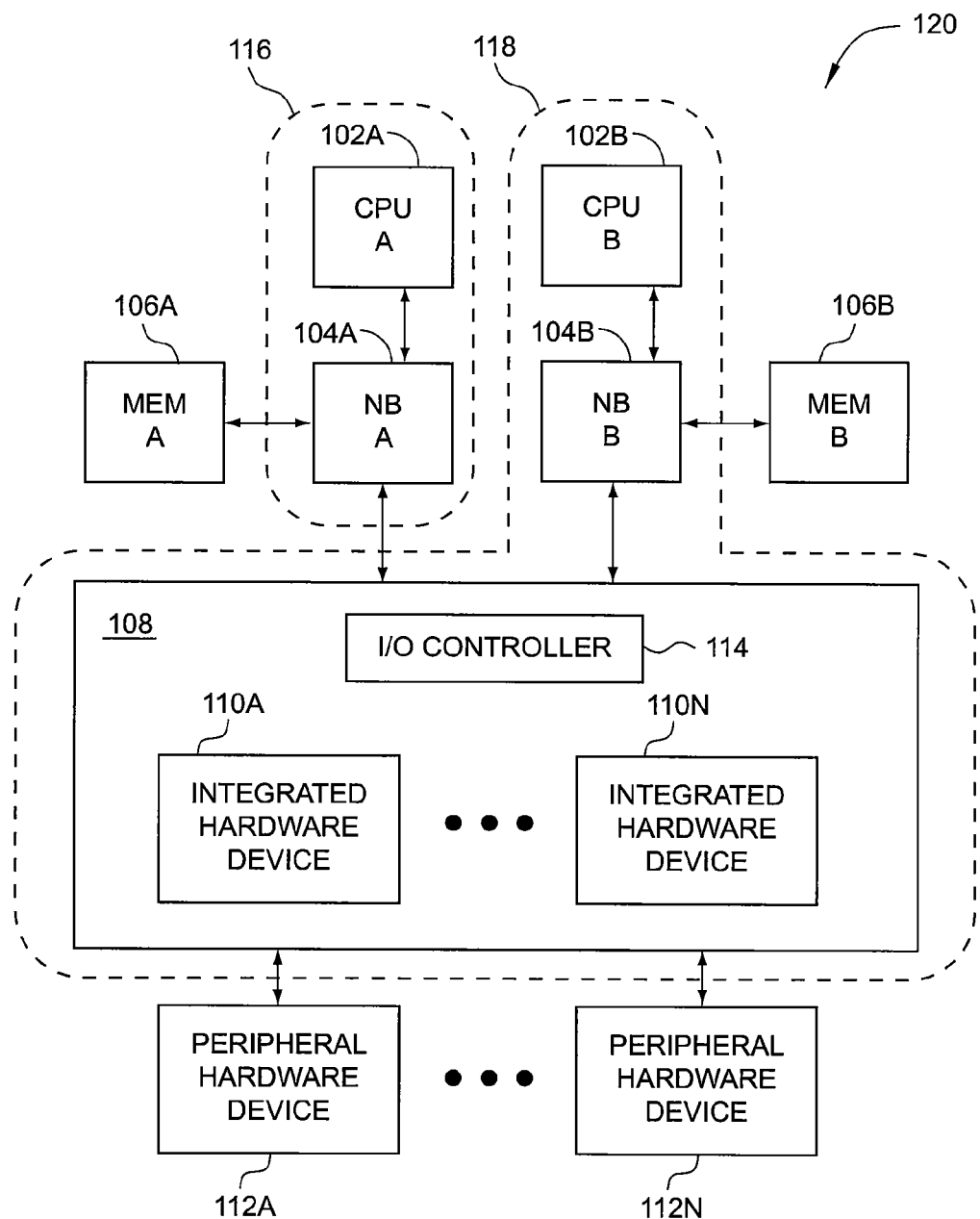

The computer system 100 architecture illustrated in FIG. 1A, also, may be embodied as any number of chips, as described in greater detail in FIGS. 1B-4D. FIG. 1B is a conceptual diagram of a computer system 120 configured to bind and migrate hardware devices among heterogeneous processing units, according to one embodiment of the invention. The computer system 120 may include the same components as the computer system 100 illustrated in FIG. 1A. As shown, the processor 102A and the memory bridge 104A are integrated on a first chip 116, and the processor 102B, the memory bridge 104B, and the I/O management module 108 are integrated on a second chip 118. The second chip 118 supports an external connection to the first chip 116. In one embodiment, second chip 118 comprises a System-On-A-Chip with full functionality that can be upgraded to include an additional external processor or a memory bridge (i.e., upgraded to connect to the first chip 116).

Figure 1C:
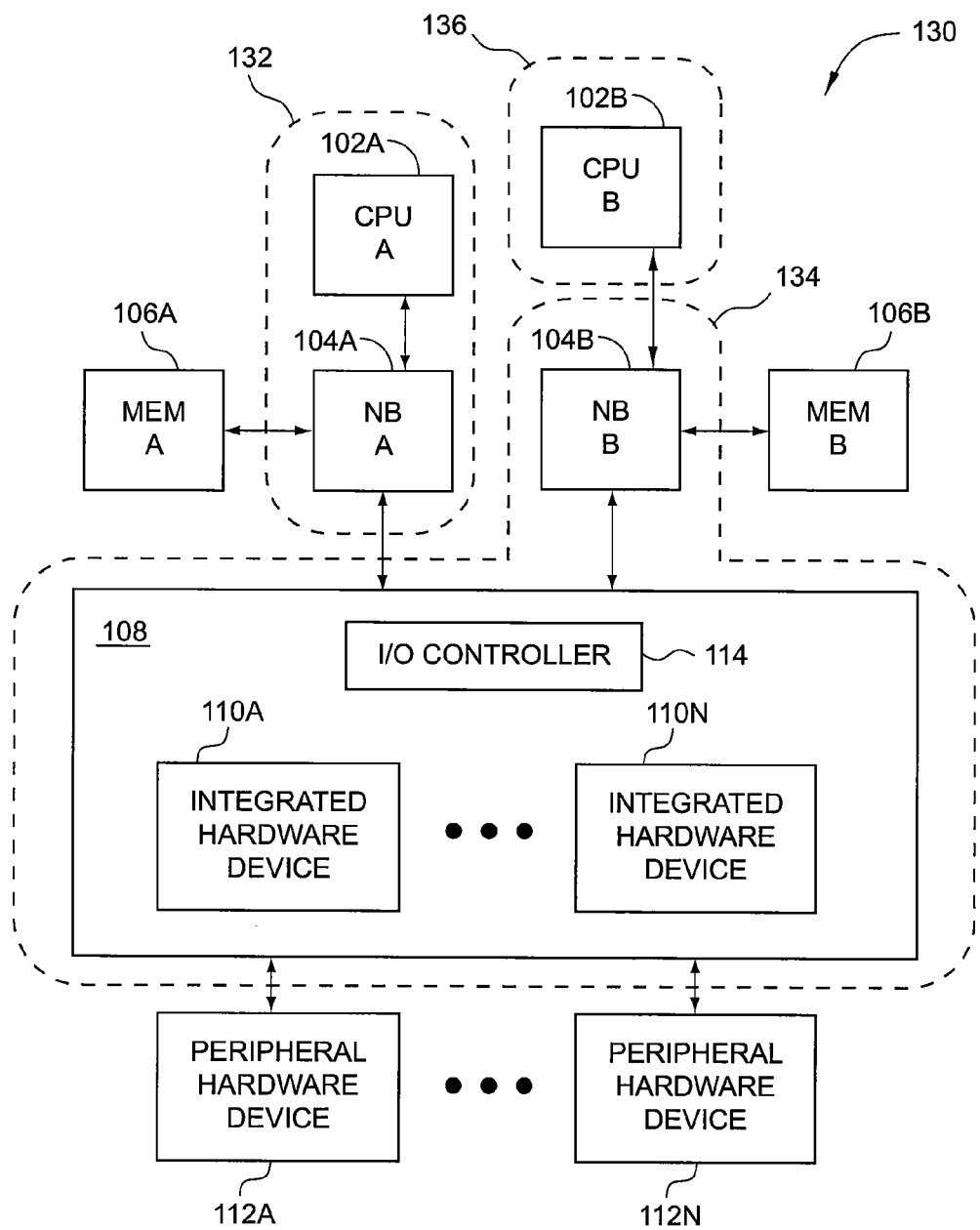

FIG. 1C is a conceptual diagram of a computer system 130 configured to bind and migrate hardware devices among heterogeneous processing units, according to one embodiment of the invention. Again, the computer system 130 may include the same components as the computer system 100 illustrated in FIG. 1A. As shown, the processor 102A and the memory bridge 104A are integrated on a first chip 132, the memory bridge 104B and the I/O management module 108 are integrated on a second chip 134, and the processor 102B is integrated on a third chip 136. In one embodiment, the first chip 132 is provided by a first vendor that supplies chips that include a processor and a corresponding memory bridge, and the second chip 134 and/or the third chip 136 are provided by a second vendor.

Figure 1D:
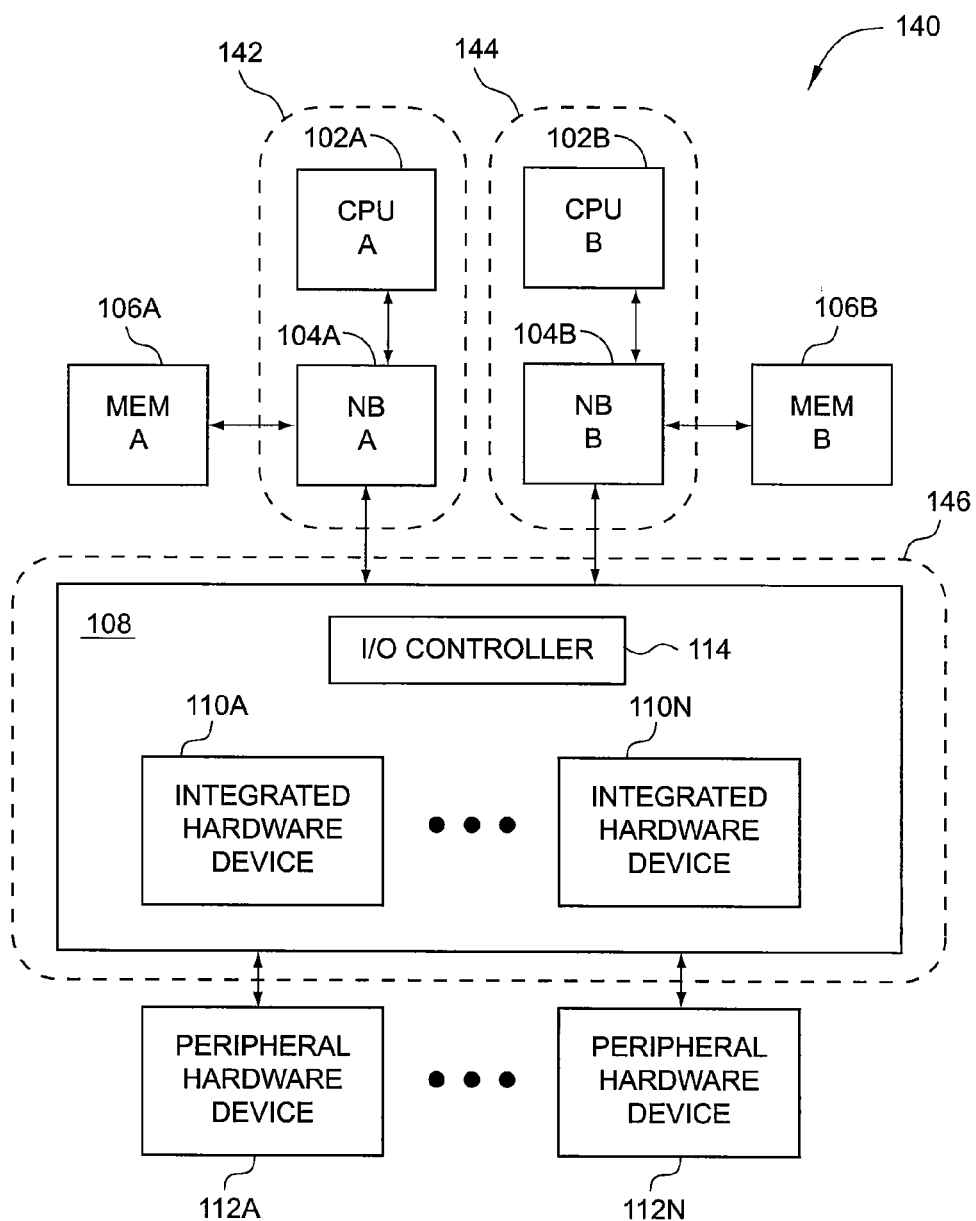

FIG. 1D is a conceptual diagram of a computer system 140 configured to bind and migrate hardware devices among heterogeneous processing units, according to one embodiment of the invention. Again, the computer system 140 may include the same components as the computer system 100 illustrated in FIG. 1A. As shown, the processor 102A and the memory bridge 104A are integrated on a first chip 142, the processor 102B and the memory bridge 104B are integrated on a second chip 144, and the I/O management module 108 is integrated on a third chip 146.

As should be apparent to those having ordinary skill in the art, other combinations of chips, other than those illustrated in FIGS. 1B-1D, are within the scope of embodiments of the invention. In various embodiments, the connection between any memory bridge and the chipset may be PCI Express (PCIe), PCIe in combination with Desktop Management Interface (DMI) standards, HyperTransport (HT), a proprietary and/or internal chipset interface, or any other Southbridge to Northbridge connection. Additionally, in various embodiments, the connection between a particular processor and the corresponding memory bridge is specific to the processor vendor. In still further embodiments, each processor may be executing any software, including different operating systems, and each processor may be configured with its own address map as if it were the only processor in the computer system. For example, each processor and/or operating system may expect to view the hardware devices as though those hardware devices were dedicated to that particular processor and/or operating system. Again, embodiments of the invention provide support for hardware devices to be accessed by multiple processors, even when these hardware devices are not specifically designed to work with a multi-processor and/or heterogeneous-processor computing environment.

Figure 2:
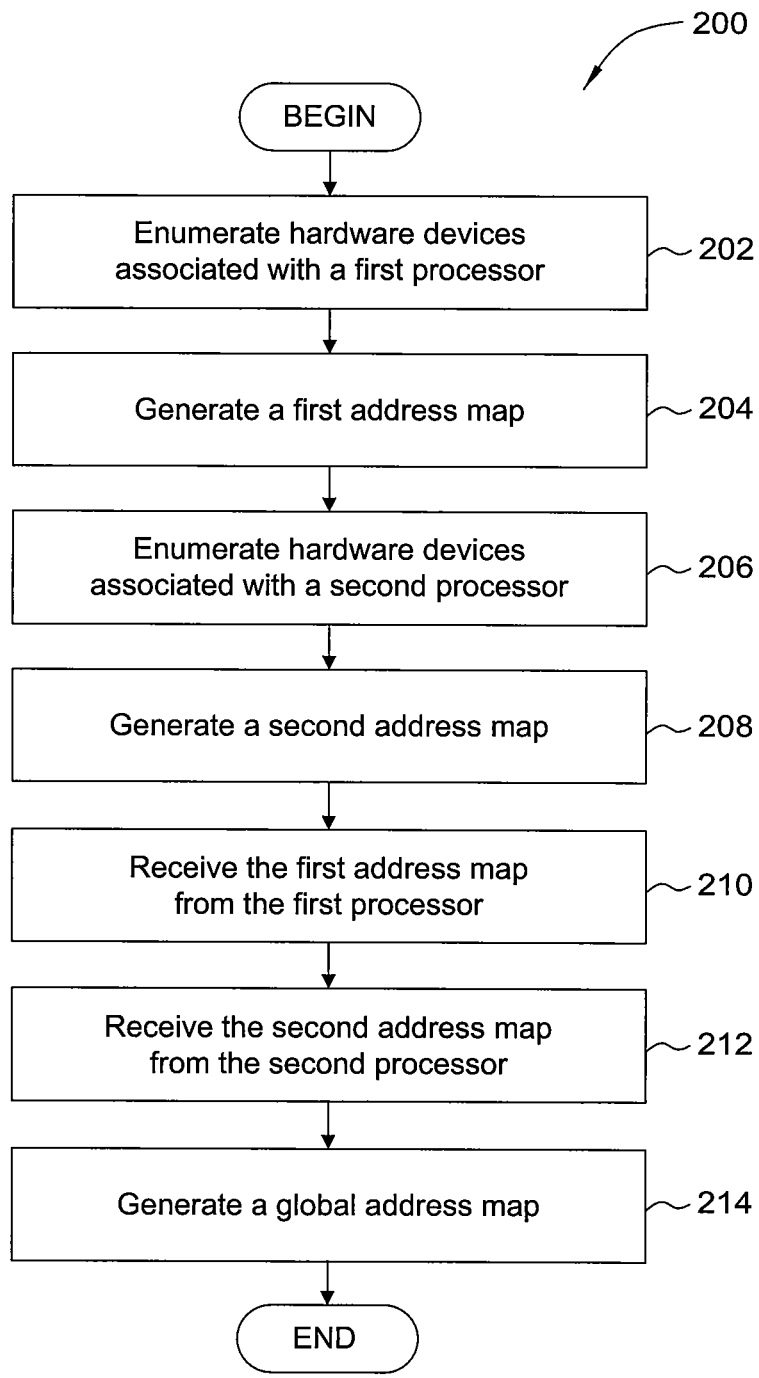
FIG. 2 is a flow diagram of method steps for generating a global address map, according to one embodiment of the invention.

FIG. 2 is a flow diagram of method steps for generating a global address map, according to one embodiment of the invention. Persons skilled in the art will understand that, even though the method 200 is described in conjunction with the systems of FIGS. 1A-1D, any system configured to perform the method steps, in any order, is within the scope of embodiments of the invention.

As shown, the method 200 begins at step 202, where the hardware devices associated with a first processor (e.g., processor 102A) are enumerated. In one embodiment, enumerating the hardware devices is performed, at least in part, by firmware code (e.g., BIOS and/or other system software) executed by the first processor. In an alternative embodiment, the I/O controller 114 enumerates the hardware devices associated with the first processor.

At step 204, a first address map is generated that provides a "memory space" for the first processor. Memory addresses in the first address map may refer either to physical memory or to memory-mapped I/O apertures for the enumerated hardware devices that the first processor is configured to access.

At step 206, the hardware devices associated with a second processor (e.g., processor 102B) are enumerated. Step 206 may be performed in a substantially similar manner to the step 202. However, the enumerated devices associated with the first processor may be different than the enumerated devices assocaited with the second processor. In one embodiment, all of the hardware devices included in the computer system are enumerated by each processor. In an alternative embodiment, each hardware device is statically bound to only one processor during enumeration so that only that processor can access that particular hardware device. In further embodiments, some of the hardware devices are enumerated by both processors and other hardware devices are enumerated by only one of the processors.

At step 208, a second address map is generated that provides a "memory space" for the second processor. Similar to the first address map generated at step 204, memory addresses in the second address map may refer either to physical memory or to memory-mapped I/O apertures for the enumerated hardware devices that the second processor is configured to access. However, since the list of enumerated devices that the second processor is able to access may be different than the list of enumerated devices that the first processor is able to access, the second address map may be different than the first address map. Additionally, even when the list of enumerated devices and the size of each memory mapped aperture is the same for both processors, the processor and/or operating system executed by each processor may implement a different scheme when generating the address map. Accordingly, even in this scenario, the first and second address maps may be different.

At step 210, the I/O management module 108 receives the first address map from the first processor. As described above, the first address map defines a "view" of the processor relative to the hardware devices in the system. In order for transactions to be routed between the first processor and hardware devices, the I/O management module 108 receives and stores the first address map.

At step 212, the I/O management module 108 receives the second address map from the second processor. Step 212 is substantially similar to step 210, described above.

At step 214, the I/O management module 108 generates a global address map by combining the first address map and the second address map. As described herein, the global address map allows transactions originating from each processor to be routed to the appropriate hardware device, and allows transactions originating from hardware devices to be routed to the appropriate processor. In one embodiment, the addresses included in the global address map include the addresses in the first address map pre-pended with a "0" and the addresses in the second address map pre-pended with "1". In this manner, the global address space includes one additional bit relative the address space of first address map and/or the second address map. In alternative embodiments, where more than two processors are included in the computer system, additional pre-pended bits may be included to disambiguate between the processors. In further alternative embodiments, the first address map and the second address map are combined into the global address map using more complicated techniques, independent and distinct from pre-pending a bit to the address maps.

Figure 3:
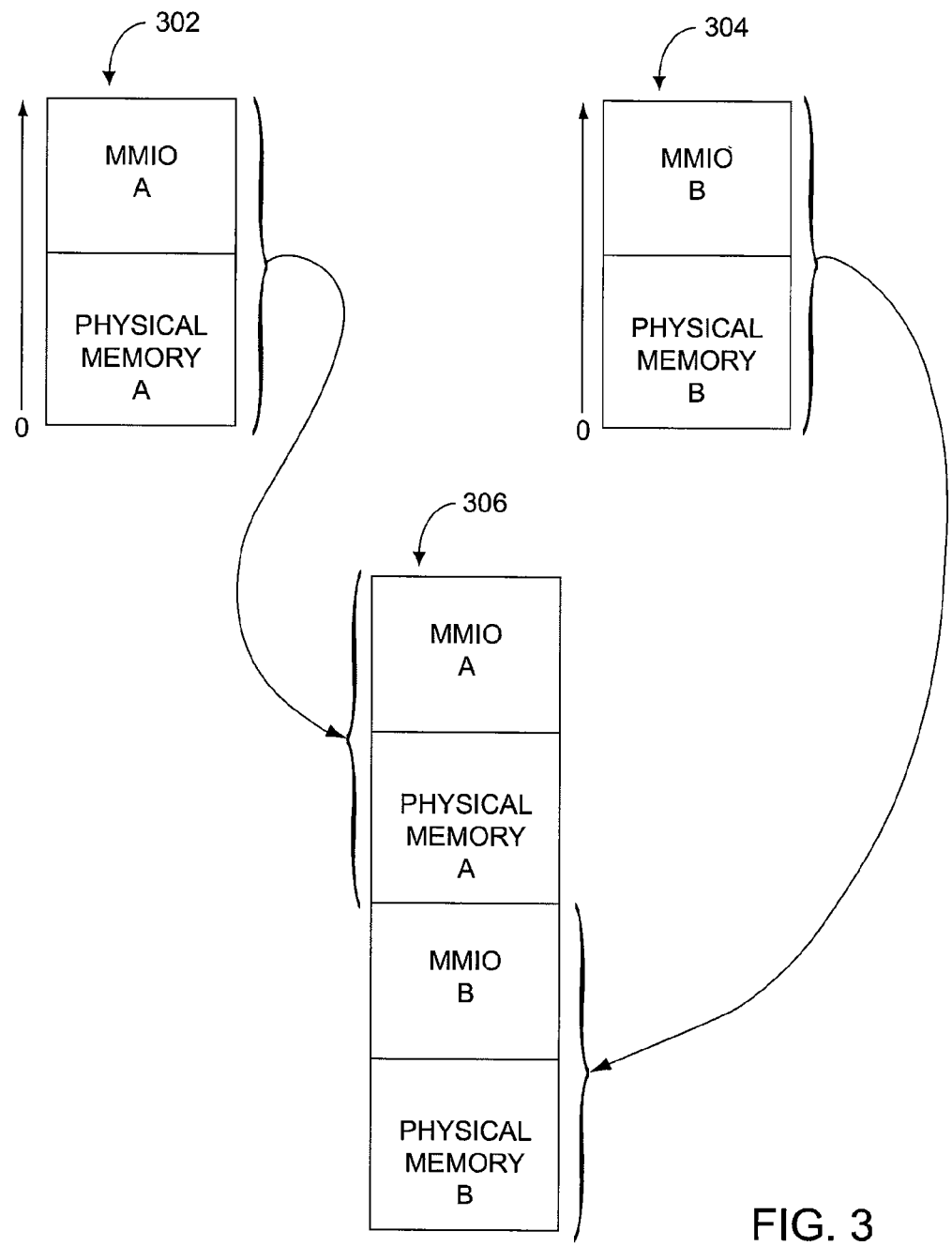
FIG. 3 is a conceptual diagram that illustrates a global address map, according to one embodiment of the invention.

FIG. 3 is a conceptual diagram that illustrates a global address map 306, according to one embodiment of the invention. As shown, a first address map 302, which includes a first MMIO portion and a first physical memory portion, is combined with a second address map 304, which includes a second MMIO portion and a second physical memory portion, to generate the global address map 306.

The method and system described in FIGS. 2 and 3 relate specifically to memory space address maps. Additionally, a similar method and system may be implemented to generate "configuration space" address maps for the first processor and the second processor that are combined into a global configuration space map. As is known, configuration space addresses are of the form <bus, device, function>, and are the addresses used for configuration cycles between a processor and a hardware device and for routing certain PCIe transaction packets.

Figure 4:
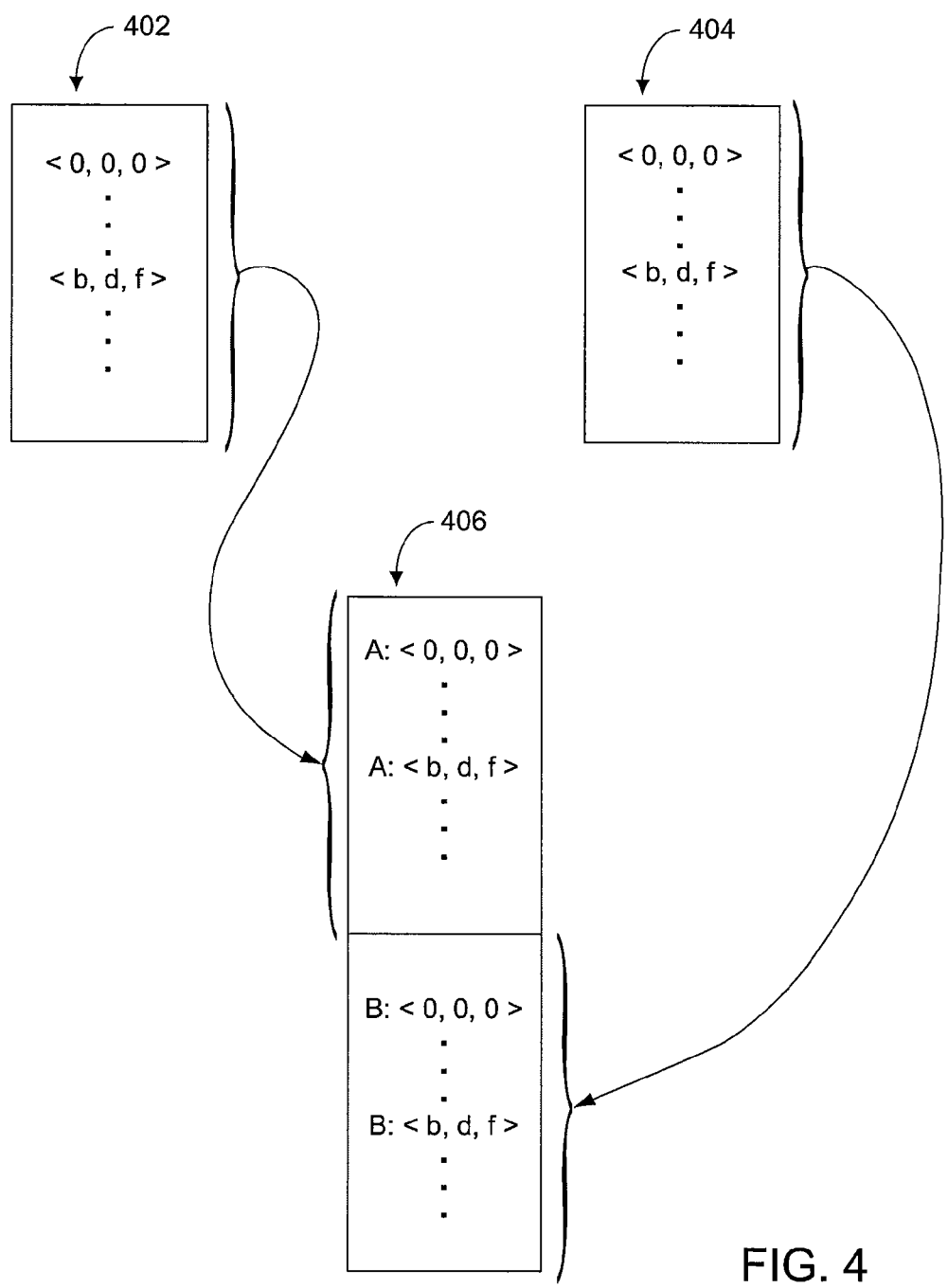
FIG. 4 is a conceptual diagram that illustrates a global configuration space map, according to one embodiment of the invention.

FIG. 4 is a conceptual diagram that illustrates a global configuration space map 406, according to one embodiment of the invention. As shown, a first configuration space address map 402 associated with a first processor (e.g., processor 102A) can be combined with a second configuration space address map 404 associated with a second processor (e.g., processor 102B) to generate the global configuration space address map 406. Similar to the global address map 306 described in FIG. 3, the global configuration space address map 406 may included one or more pre-pended bits or may combine the first and second configuration space address maps using any other technically-feasible technique.

Figure 5:
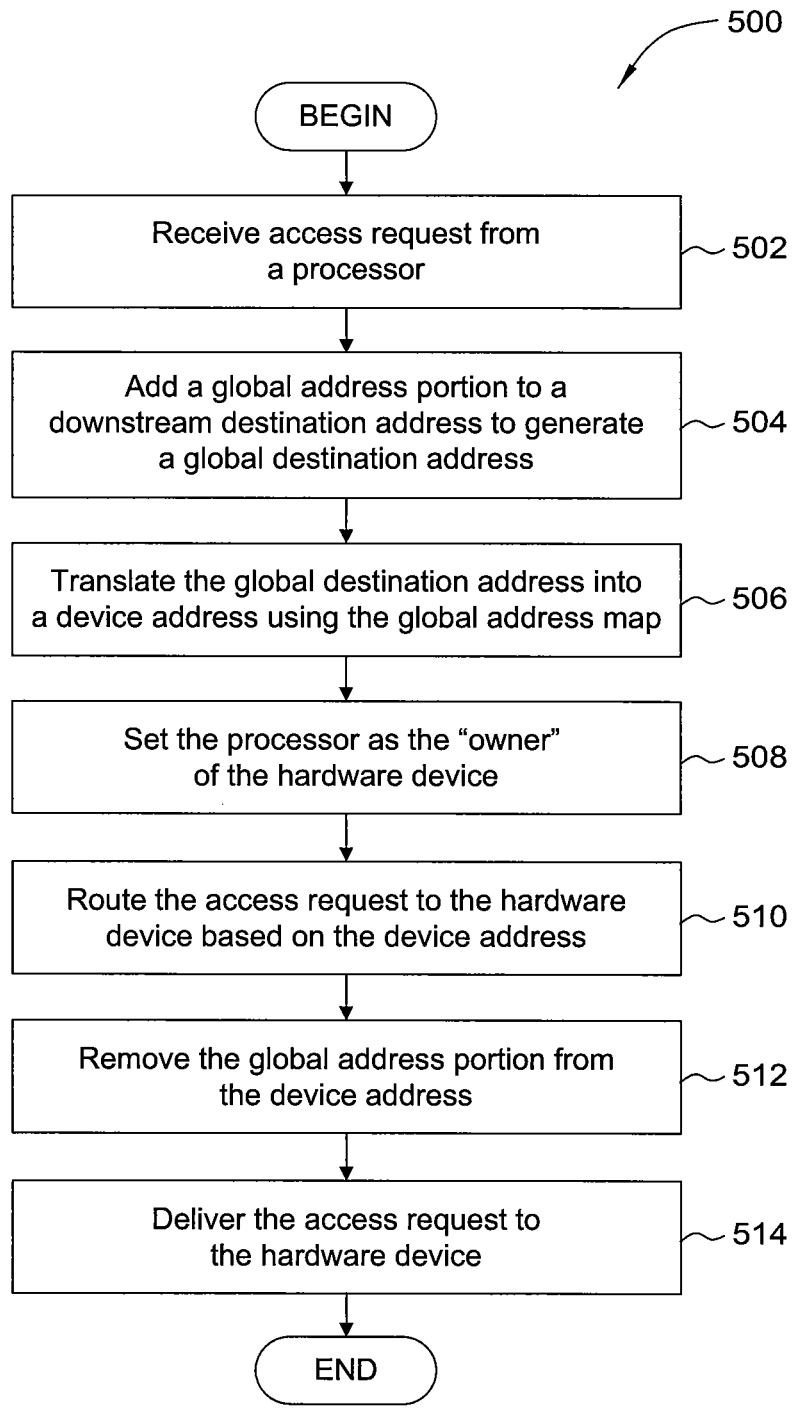
FIG. 5 is a flow diagram of method steps for routing an access request from a processor to a hardware device, according to one embodiment of the invention.

FIG. 5 is a flow diagram of method steps for routing an access request from a processor to a hardware device, according to one embodiment of the invention. Persons skilled in the art will understand that, even though the method 500 is described in conjunction with the systems and/or methods of FIGS. 1A-4, any system configured to perform the method steps, in any order, is within the scope of embodiments of the invention.

As shown, the method 500 begins at step 502, where the I/O management module 108 receives an access request from a processor. The processor could be, for example, one of the processors 102A, 102B. The access request could include a MMIO address or a configuration space address, as described above.

At step 504, the I/O management module 108 adds a global address portion to a downstream destination address included in the access request to generate a global destination address. In one embodiment, a "0" is pre-pended to the downstream destination address if the access request is received from a first processor (e.g., processor 102A); whereas, a "1" is pre-pended to the downstream destination address if the access request is received from a second processor (e.g., processor 102B).

At step 506, the I/O management module 108 translates the global destination address into a device address based on the global address map. In one embodiment, the device address includes the physical hardware address of the hardware device in the computer system. For example, the global address map may comprise the global address map 306, described in FIG. 3. At step 508, the I/O management module 108 sets the processor from which the access request is received as the "owner" of the hardware device. In this manner, the hardware devices are dynamically bound to the last processor that issued an access request to that hardware device. This binding is useful when routing return transactions from the hardware device to the appropriate processor, as described in greater detail in FIG. 6.

Binding of ownership can be accomplished in several ways. In one embodiment, as described above, a hardware device may be bound to the last processor that issued a downstream transaction directed towards the hardware device. In this embodiment, subsequent upstream transactions are translated into the global address space corresponding to the "owner" of the last downstream transaction.

In an alternative embodiment, the I/O management module 108 includes an integrated hardware device (e.g., a "BindDev" device) that is configured to bind any hardware device to any processor included in the computer system. When BIOS or system software enumerates the hardware devices, BindDev is discovered, a table of the available hardware devices is generated, and a determination is made as to which processor each hardware device should be bound. The enumeration software writes this table to BindDev, which stores the table in the I/O management module 108. To use BindDev, one processor may boot first, and its BIOS may enumerate and bind all devices in the system. Alternatively, the BIOS and/or system software on each processor may coordinate to use BindDev to bind devices to the processor. As devices enter and exit the system, the table is updated (triggered by hot plug events). Additionally, BindDev may support different bindings for different types of transactions. For example, device ownership may be different for a particular hardware device depending on whether the transaction involved is a configuration transaction, a message transaction, an I/O transaction, or a memory-mapped transaction. Also, system software may re-bind a hardware device to a different processor at any time after the system has booted, using the techniques described above.

Additionally, once a processor is set to be the "owner" of a particular hardware device, this information is stored for retrieval during "upstream transactions." In the embodiment where a "BindDev" hardware device is configured to bind the processors to particular devices, the "BindDev" hardware device stores the ownership information. Alternatively, in "dynamic" binding embodiments, this information may be stored anywhere in the I/O management module 108 that is available on the transaction path between the processors and the hardware devices. In one embodiment, the I/O controller 114 stores the ownership information. In another embodiment, a "wrapper" around the hardware device stores the ownership information. In yet another embodiment, some hardware devices may themselves support the notion of ownership and store the ownership information. In still further embodiments, device ownership is stored in an ingress/egress port between the memory controller 104A and/or 104B and the I/O management module 108, or in an ingress/egress port between the I/O management module 108 and the hardware device.

At step 510, the I/O management module 108 routes the access request to the hardware device based on the device address. At step 512, the I/O management module 108 removes the global address portion and, at step 514, delivers the access request to the hardware device. In one embodiment, neither the processor nor the hardware device is aware that there are multiple processors in the computer system that can access the hardware device. The global address portion, e.g., the pre-pended bit, is removed from the address portion of the access request since the hardware device expects an address having the same number of bits as the original downstream destination address included in the access request when the access request was received by the I/O management module.

Figure 6:
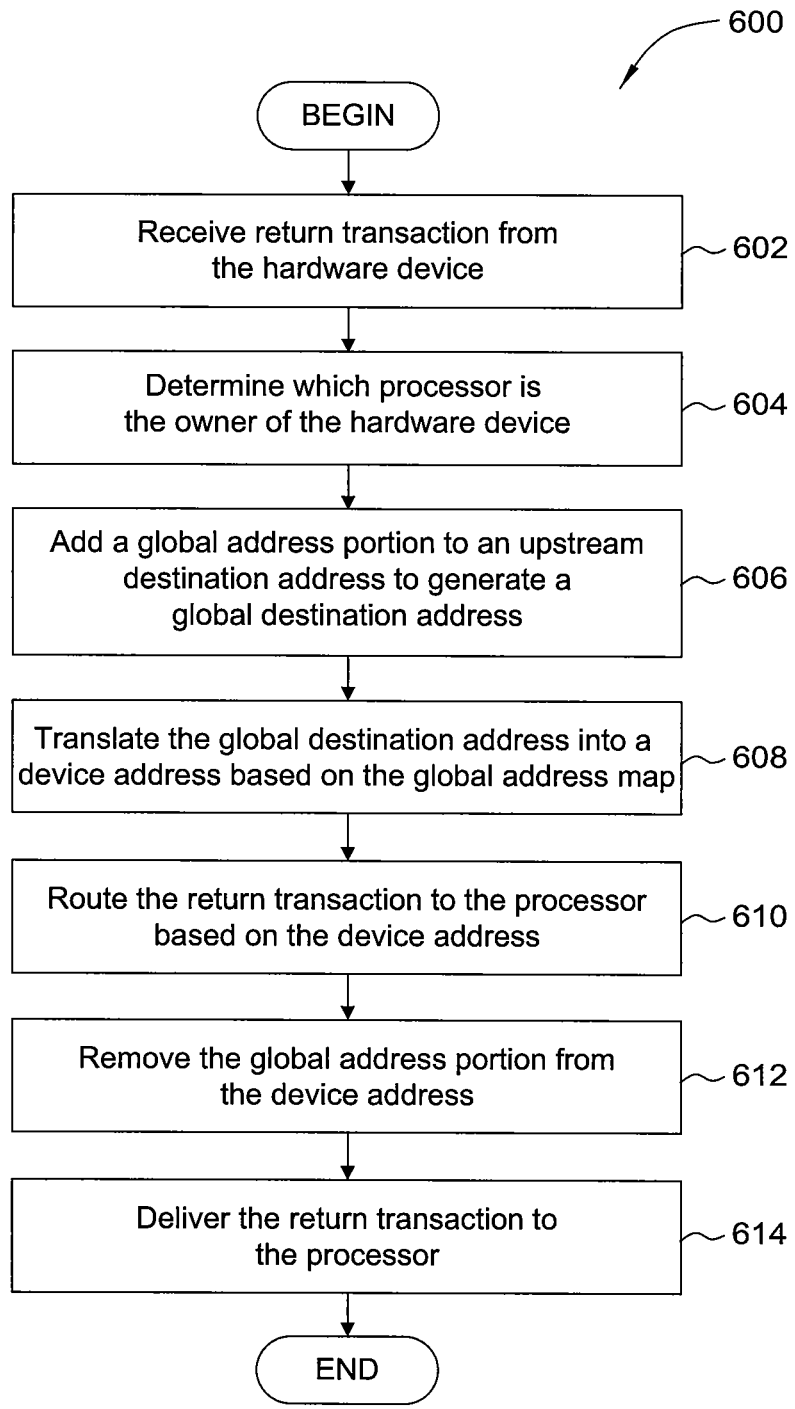
FIG. 6 is a flow diagram of method steps for routing a return transaction from a hardware device to a processor, according to one embodiment of the invention.

FIG. 6 is a flow diagram of method steps for routing a return transaction from a hardware device to a processor, according to one embodiment of the invention. Persons skilled in the art will understand that, even though the method 600 is described in conjunction with the systems and methods of FIGS. 1A-5, any system configured to perform the method steps, in any order, is within the scope of the invention.

As shown, the method 600 begins at step 602, where the I/O management module 108 receives a return transaction from the hardware device. The return transaction is also referred to herein as an "upstream transaction." In various embodiments, the return transaction comprises (a) an upstream device completion that results from a previous downstream non-posted request (e.g., read return data) (b) transaction involving reads from and/or writes to system memory for device controller direct memory access (DMA), (c) upstream messages (e.g., interrupts), and (d) peer-to-peer transactions between two hardware devices. Peer-to-peer transactions, according to embodiments of the invention, are handled differently by the I/O management module 108 relative to the other three types of upstream transactions. As such, processing peer-to-peer transactions is outside the scope of the method 600 described in FIG. 6, and is discussed further below.

At step 604, the I/O management module 108 determines which processor is the owner of the hardware device from which the upstream transaction is received. The I/O management module 108 may check the ownership information generated at step 508.

At step 606, I/O management module 108 adds a global address portion to an upstream destination address to generate a global destination address. The global address portion that is added depends on which processor is the owner of the hardware device that sends the upstream transaction. In one embodiment, adding the global address portion comprises pre-pending a bit to the upstream destination address based on which processor is the owner of the hardware device.

At step 608, the I/O management module 108 translates the global destination address into a device address based on the global address map, and at step 610, the I/O management module 108 routes the upstream transaction to the appropriate processor based on the global address. In one embodiment, steps 608 and 610 are substantially similar to steps 506 and 510, respectively, as described previously herein.

At step 612, the I/O management module 108 removes the global address portion from the device address, and at step 614, the I/O management module 108 delivers the upstream transaction to the processor. In one embodiment, steps 612 and 614 are substantially similar to steps 512 and 514, respectively, as described previously herein.

In alternative embodiments, the I/O management module 108 can also route peer-to-peer transactions between two hardware devices. For example, a processor initiates the peer-to-peer transaction by issuing an access request to a first hardware device (e.g., hardware device A), which in turn issues an upstream transaction directed towards a second hardware device (e.g., hardware device B). In one embodiment, the processor that issued the original access request is set as the owner of both hardware devices. Accordingly, no additional modifications are required to support the peer-to-peer transaction since the destination address of the upstream transaction (i.e., the destination address of hardware device B) is the same in the local address maps of both hardware devices. In another embodiment, the computer system can be configured by BIOS or system software included in the I/O management module 108 to allocate peer-to-peer apertures at the same offsets in all processor address maps so that device "ownership" is immaterial. In this manner, peer-to-peer transaction routing "just works" since the destination addresses of all upstream peer-to-peer transaction for each hardware device are the same, no matter which processor initiated the peer-to-peer transaction.

Advantageously, heterogeneous CPUs included in multi-CPU system can access any integrated hardware device included within the chipset or any peripheral hardware device attached on an external bus (e.g., PCI, PCIe, etc), without modifying the CPU, the operating system, or the hardware devices. Embodiments of the invention allow for more complex and interesting computing systems to be assembled. For example, a system-on-chip with a relatively "weak" processor can be easily "upgraded" by being connecting to a docking station that includes a high-performance CPU and/or GPU to provide for more processing performance. Additionally, the two CPUs can be heterogeneous and/or made by different vendors, which allows for even more interesting multi-CPU computer systems to be assembled.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method for providing access to hardware devices included in a computer system by a processor without causing conflicts with other processors included in the computer system, the method comprising:

receiving a first address map from a first processor that includes memory-mapped input/output (I/O) apertures for a first set of hardware devices including a first aperture associated with a first hardware device that the first processor is configured to access;

receiving a second address map from a second processor that includes memory-mapped I/O apertures for a second set of the hardware devices including a second aperture associated with the first hardware device that the second processor is configured to access;

generating a global address map by combining the first address map and the second address map, wherein the global address map includes the first aperture and the second aperture;

receiving a first access request from the first processor; and routing the first access request to the first hardware device associated with the first access request based on an address mapping included in the global address map.

2. The method of claim 1, further comprising the steps of:
generating a first global destination address by adding a first global address portion to a first destination address associated with the first access request;
translating the first global destination address into a first device address based on the global address map;
setting the first processor as an owner of the first hardware device;
removing the global address portion from the translated destination address; and
delivering the first access request to the first hardware device.

3. The method of claim 2, wherein the step of adding the first global address portion comprises pre-pending a bit to the first destination address included in the first access request.

4. The method of claim 1, wherein the bit has a value of zero when the first access request is received from the first processor, and the bit has a value of one bit when the first access request is received from the second processor.

5. The method of claim 1, further comprising the steps of:
receiving a return transaction from the first hardware device;
determining that the first processor is the owner of the first hardware device;
generating a second global destination address by adding a second global address portion to a second destination address associated with the return transaction;
translating the second global destination address into a second device address using the global address map;
routing the return transaction to the first processor based on an address mapping included in the global address map;
removing the second global address portion from the translated destination address; and
delivering the return transaction to the first processor.

6. The method of claim 2, wherein the step of adding the global address portion comprises pre-pending a bit to the second destination address included in the return transaction.

7. The method of claim 3, wherein the return transaction comprises an interrupt or a device completion message.

8. The method of claim 1, wherein the first processor and second processor are configured to execute different instruction sets and different operating systems.

9. A computer-readable medium storing instructions, that when executed by a processor, cause a computer system to provide access to hardware devices included in the computer system by a first processor without causing conflicts with other processors included in the computer system, by performing the steps of:
receiving a first address map from the first processor that includes memory-mapped input/output (I/O) apertures for a first set of hardware devices including a first aperture associated with a first hardware device that the first processor is configured to access;
receiving a second address map from a second processor that includes memory-mapped I/O apertures for a second set of the hardware devices including a second aperture associated with the first hardware device that the second processor is configured to access;
generating a global address map by combining the first address map and the second address map, wherein the global address map includes the first aperture and the second aperture;
receiving a first access request from the first processor; and
routing the first access request to the first hardware device associated with the first access request based on an address mapping included in the global address map.

10. A device controller for routing signals from a processing unit to one or more devices included in a computer without causing conflicts with other processing units included in the computer system, comprising:
one or more hardware devices; and
an input/output (I/O) controller configured to:
receive a first address map from a first processor that includes memory-mapped I/O apertures for a first set of hardware devices including a first aperture associated with a first hardware device that the first processor is configured to access;
receive a second address map from a second processor that includes memory-mapped I/O apertures for a second set of the hardware devices including a second aperture associated with the first hardware device that the second processor is configured to access;
generate a global address map by combining the first address map and the second address map, wherein the global address map includes the first aperture and the second aperture;
receive a first access request from the first processor; and
route the first access request to the first hardware device associated with the first access request based on an address mapping included in the global address map.

11. The device controller of claim 10, wherein the I/O controller is further configured to:
generate a first global destination address by adding a first global address portion to a first destination address associated with the first access request;
translate the first global destination address into a first device address based on the global address map;
set the first processor as an owner of the first hardware device;
remove the global address portion from the translated destination address; and
deliver the first access request to the first hardware device.

12. The device controller of claim 11, wherein adding the first global address portion comprises pre-pending a bit to the first destination address included in the first access request.

13. The device controller of claim 12, wherein the bit has a value of zero when the first access request is received from the first processor, and the bit has a value of one bit when the first access request is received from the second processor.

14. The device controller of claim 10, wherein the I/O controller is further configured to:
receive a return transaction from the first hardware device;
determine that the first processor is the owner of the first hardware device;
generate a second global destination address by adding a second global address portion to a second destination address associated with the return transaction;
translate the second global destination address into a second device address using the global address map;
route the return transaction to the first processor based on an address mapping included in the global address map;
remove the second global address portion from the translated destination address; and
deliver the return transaction to the first processor.

15. The device controller of claim 14, wherein adding the global address portion comprises pre-pending a bit to the second destination address included in the return transaction.

16. The device controller of claim 15, wherein the return transaction comprises an interrupt or a device completion message.

17. The device controller of claim 10, wherein the first processor and second processor are configured to execute different instruction sets and different operating systems.

18. The method of claim 1, wherein a first global destination address within the first aperture is mapped to a first device address of the first hardware device and a first global destination address within the second aperture is also mapped to the first device address of the first hardware device.

19. The computer-readable medium of claim 9, wherein a first global destination address within the first aperture is mapped to a first device address of the first hardware device and a first global destination address within the second aperture is also mapped to the first device address of the first hardware device.

20. The device controller of claim 10, wherein a first global destination address within the first aperture is mapped to a first device address of the first hardware device and a first global destination address within the second aperture is also mapped to the first device address of the first hardware device.

* * * * *